(12) United States Patent
Haber

(10) Patent No.: US 9,220,375 B2
(45) Date of Patent: Dec. 29, 2015

(54) SPRING BALANCED CHAFING DISH

(75) Inventor: David Haber, Armonk, NY (US)

(73) Assignee: David Haber, Armonk, NY (US)

( * ) Notice: Subject to any disclaimer, the term of this patent is extended or adjusted under 35 U.S.C. 154(b) by 679 days.

(21) Appl. No.: 13/494,996

(22) Filed: Jun. 13, 2012

(65) Prior Publication Data
US 2012/0318803 A1 Dec. 20, 2012

(51) Int. Cl.
*A47J 47/14* (2006.01)
*A47J 36/24* (2006.01)
*A47J 36/12* (2006.01)

(52) U.S. Cl.
CPC . *A47J 47/14* (2013.01); *A47J 36/12* (2013.01); *A47J 36/24* (2013.01); *A47J 36/2405* (2013.01)

(58) Field of Classification Search
CPC ....... A47J 36/2405; A47J 36/12; A47J 36/06; A47J 36/24

USPC .............. 220/573.1, 832, 831, 264, 263, 262, 220/562; 16/404, 401
See application file for complete search history.

(56) References Cited

U.S. PATENT DOCUMENTS

| | | | | |
|---|---|---|---|---|
| 911,137 | A | * | 2/1909 | Lange ............................ 220/283 |
| 2,354,927 | A | * | 8/1944 | Propernick ...................... 49/386 |
| 5,549,039 | A | * | 8/1996 | Ito et al. .......................... 99/340 |

* cited by examiner

*Primary Examiner* — Stephen Castellano
(74) *Attorney, Agent, or Firm* — North Shore Patents, P.C.; Michele Liu Baillie

(57) ABSTRACT

A chafing dish includes a pan, a cover hingedly connected to the pan through a hinge shaft, a plurality of cover arms, each cover arm having one end secured to the hinge shaft and other end to the cover, and a counter balance member which encircles a part of the hinge shaft and is secured in position at both ends in a hinge assembly, thereby enabling the counter balancing of the cover at any angle from the closed state of the cover.

13 Claims, 2 Drawing Sheets

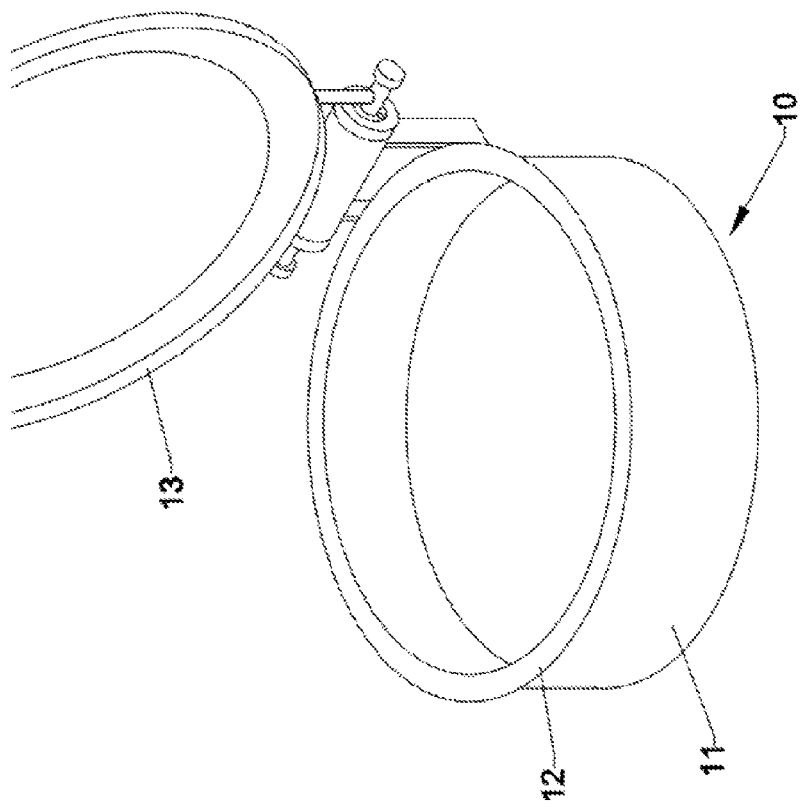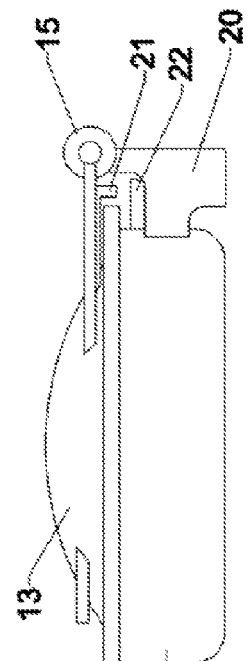
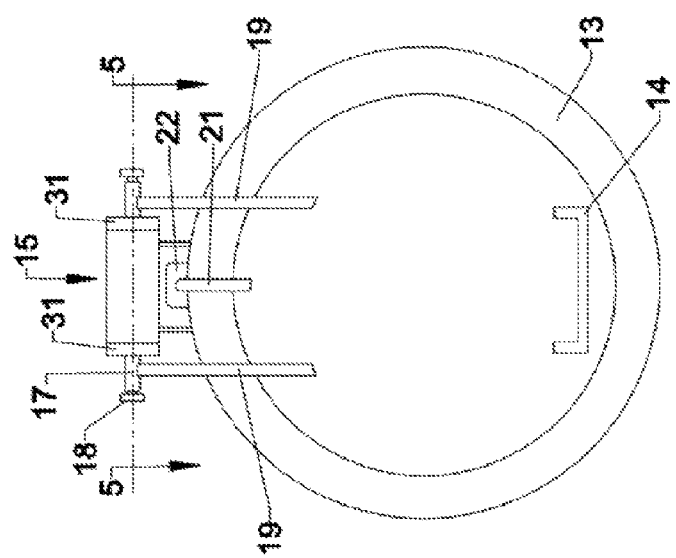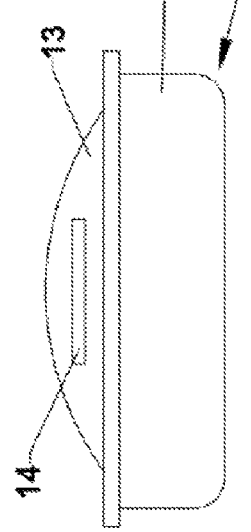
Fig 3 Top View    Fig 4
Fig 1 Front View    Fig 2 Side View

SPRING BALANCED CHAFING DISH

CROSS-REFERENCE TO RELATED APPLICATIONS

The present application claims priority to India Patent Application No. 1693/DEL/2011, filed on Jun. 14, 2011.

BACKGROUND OF THE INVENTION

1. Technical Field

This invention relates generally to the field of chafing dishes typically for buffet type serving used by restaurant and banquet facilities. The invention more specifically relates to hinged covered dishes to provide a stably held open cover up to approximately 90 degree without any supports.

2. Background

It is well known in the art to provide chafing dishes having a container for serving food. Chafing dishes are typically used on portable heating devices such as induction stoves, propane stoves, and alcohol gel fueled grills. Conventional chafing dishes used in the catering industry have a number of limitations. A problem associated with the conventional chafing dishes is the horizontal force generated when the cover is opened, which can move the chafer off the stove. Thus, there is a need for developing a means of securing the chafer to the stove.

Further, conventional chafing dishes use friction pads to maintain the chosen open position of the cover during use. Some chafing dishes use rubbery type friction pads, adjusted so that the cover slowly closes during use.

Another problem with the conventional chafers is that the friction pads wear off with use which loosens the set up causing the covers to fall closed.

Therefore, there is a need for a chafing dish that overcomes the above and other shortcomings present in current chafing dishes.

BRIEF SUMMARY OF THE INVENTION

According to one embodiment of the present invention, a chafing dish comprises: a pan; a cover; a hinge shaft coupled to the pan and the cover; a first cover arm coupled to a first end of the hinge shaft and to the cover; a second cover arm coupled to a second end of the hinge shaft and to the cover; a counter balance member encircling a part of the hinge shaft; and a hinge assembly coupled to a first end and a second end of the counter balance member, the counter balance member having a torsion enabling a counter balancing of the cover at any angle from a closed state to an unstressed state.

In one aspect of the present invention, the chafing dish comprises an externally adjustable balance adjustment mechanism coupled proximately to the first end of the hinge shaft, comprising a bearing support for the hinge shaft, the bearing support comprising a balance adjuster and a stop adjuster protruding through end caps of the hinge assembly, whereby allowing adjustment of the chafing dish without disassembly.

In one aspect of the present invention, a first end of the first cover arm is coupled to the hinge shaft through fasteners, wherein a second end of the first cover arm is welded to the cover.

In one aspect of the present invention, the fasteners comprise thumb screws.

In one aspect of the present invention, the counter balance member comprises a torsion spring encircling the part of the hinge shaft.

In one aspect of the present invention, the first end of the counter balance member is coupled to a balance adjuster and the second end of the counter balance member is coupled to a shaft anchor.

In one aspect of the present invention, the pan comprises a water pan.

In one aspect of the present invention, the chafing dish further comprises a food pan nested inside the water pan.

In one aspect of the present invention, the chafing dish further comprises a condensate drain tube coupled to the cover and a condensate catch trough coupled to the pan, wherein condensate from the cover is able to drain from the condensate drain tube to the pan through the condensate catch trough.

In one aspect of the present invention, the chafing dish further comprises a cover handle for raising and lowering the cover.

In one aspect of the present invention, the chafing dish further comprises a balance adjuster and a stop adjuster for supporting the hinge shaft.

In one aspect of the present invention, the chafing dish further comprises: a balance set screw for holding a position of the stop adjuster; and a stop set screw for holding a position of the balance adjuster.

In one aspect of the present invention, the chafing dish further comprises a shaft stop and a stop adjuster pin for limiting an opening of the cover to the unstressed state of the counter balance member.

In one aspect of the present invention, the chafing dish further comprises a hinge support frame coupled to the hinge assembly and the pan.

BRIEF DESCRIPTION OF THE SEVERAL VIEWS OF THE FIGURES

The aforementioned aspects and other features of the present invention will be explained in the following description, taken in conjunction with the accompanying drawings, wherein:

FIG. 1 illustrates a front view of a chafing dish in accordance with one embodiment of the present invention.

FIG. 2 illustrates a side view of the chafing dish of FIG. 1 in accordance with one embodiment of the present invention.

FIG. 3 illustrates a top view of the chafing dish of FIG. 1 in accordance with one embodiment of the present invention.

FIG. 4 illustrates a perspective view of the chafing dish of FIG. 1 depicting a cover in altered relative position in accordance with one embodiment of the present invention.

DETAILED DESCRIPTION OF THE INVENTION

Figure 5:
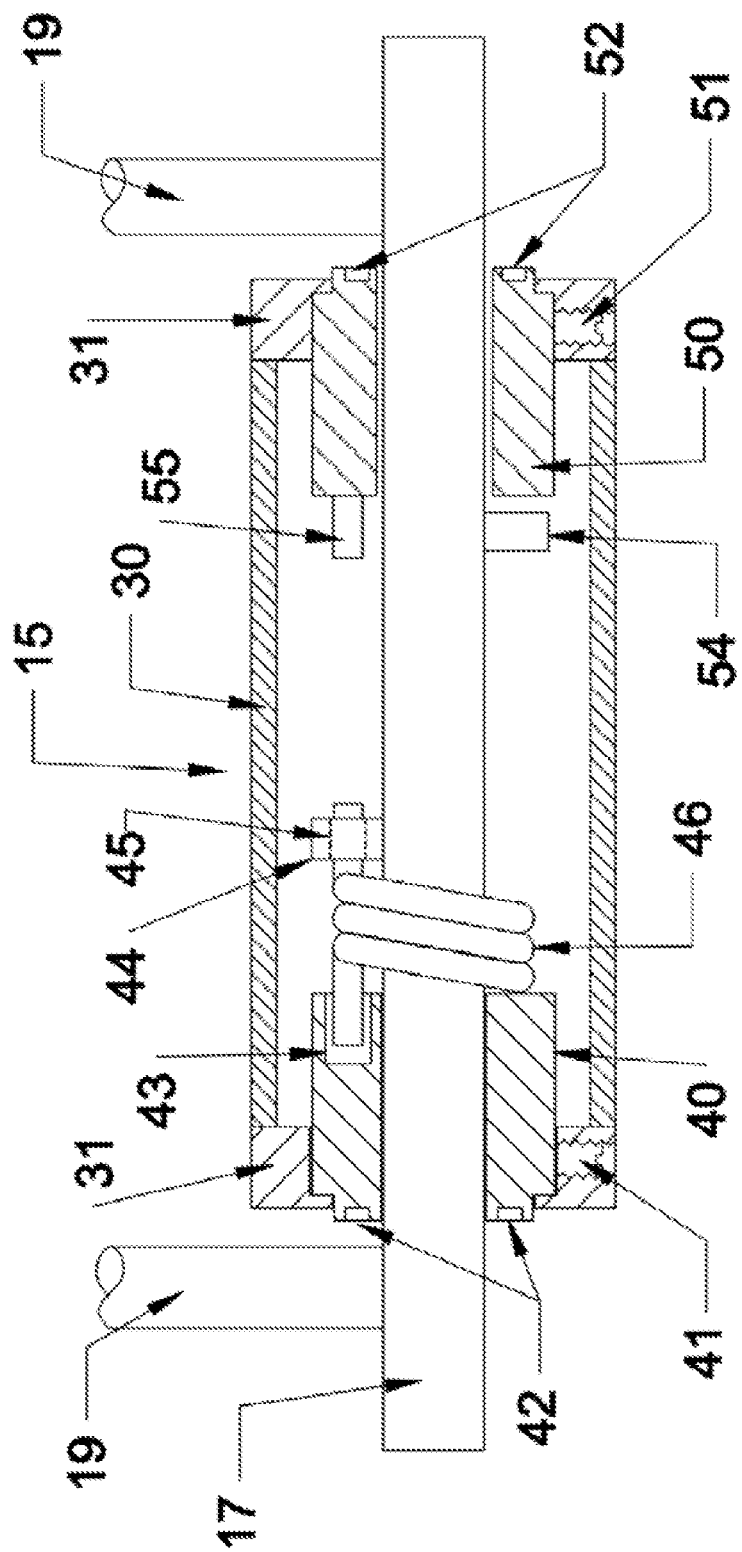
FIG. 5 illustrates a cross-sectional view of a hinge assembly of the chafing dish as seen from the plane 5-5 in FIG. 3 in accordance with one embodiment of the present invention.

One embodiment of the present invention provides a chafing dish (10), which employs a spring (46) to counterbalance a cover (13) and which further employs an externally adjustable balance adjustment mechanism. The spring based mechanism which is used to counterbalance the cover (13) permits smooth opening and closing of the cover of the chafing dish without generation of any horizontal force when the cover (13) is opened, thereby reducing the risk of the chafing dish (10) from falling off the stoves on which they are placed.

Further, the embodiment of the chafer dish of the present invention is more user friendly and the cover can be stably held open at any angle up to 90 degrees from the cover's closed state, without any support. Also, the use of externally adjustable balance adjustment mechanism permits accurate balancing without the need to disassemble and reassemble the spring loaded hinge. This allows the user to easily replace and rebalance different design covers which may be otherwise inconvenient to use.

The embodiments of the present invention are described in detail with reference to the accompanying drawings. However, the present invention is not limited to these embodiments which are only provided to explain more clearly the present invention to the ordinarily skilled in the art. In the accompanying drawings, like reference numerals are used to indicate like components.

Referring to FIG. 1 & FIG. 2, it can be seen that the chafing dish 10 of one embodiment of the present invention includes a water pan 11, a food pan 12, a cover 13, and a hinge assembly 15. The food pan 12 (FIG. 4), nests inside the water pan 11, with the top flange of the food pan 12 resting on the water pan 11. Referring to FIG. 3, the cover 13 is connected to the hinge shaft 17 by the cover arms 19, and secured using thumb screws 18. The cover 13 is raised and lowered using a cover handle 14. When the cover 13 is raised, condensate formed while heating food in the food pan 12 drains through the condensate drain tube 21 (FIG. 2), into the condensate catch trough 22, which drains into the water pan 11 through a hole in the water pan 11 (not shown). The hinge assembly 15 (FIG. 2) is welded to the hinge support frame 20, which is further welded to the water pan 11.

Referring to FIG. 5, it can be seen that end caps 31 are attached to the hinge barrel 30 with screws. The balance adjuster 40, and stop adjuster 50 are bearing supports for the hinge shaft 17, and protrude through the end caps 31, thereby making these accessible for external adjustment. Balance set screw 41, and stop set screw 51 lock these adjusters in place.

The counterbalance spring 46 has one end placed in the balance adjuster anchor hole 43 and the other end placed in the shaft anchor hole 45. As can be seen from FIG. 5, the counter balance spring 46 encircles the hinge shaft 17. In one embodiment of the present invention, the counter balance spring 46 is a counterclockwise torsion spring, which is chosen so that when operated from unstressed position to approximately 90 degrees rotation (the closed position), its torque is approximately equal to the torque required to raise the closed cover through the full range of angles from the closed position to the unstressed position.

Adjustment Operation

To adjust the full open cover position, referring to FIG. 5, the stop set screw 51 is released. While holding the cover open at 90 degrees to the closed position of FIG. 2, the stop adjuster 50 is rotated clockwise with a spanner wrench in stop spanner wrench holes 52, until the stop adjuster 50 stops. The stop set screw 51 is then tightened. When the cover 13 is opened by 90 degrees, the shaft stop 54 contacts the stop adjuster pin 55, thereby preventing further opening.

To adjust the counterbalance of the cover 13 (referring to FIG. 5), while holding the cover 13 at 90 degrees (as set in the previous paragraph), the balance set screw 41 is released and retightened. This is done to release any tension in the counter balance spring 46, and to set the trial spring tension.

The cover 13 is closed to test the counterbalance adjustment. If the cover 13 moves up from the food pan 12, the counter balance spring 46 is too tight. If the cover 13 falls when released while closing, the counter balance spring 13 is not tight enough. To further adjust the spring balance, the cover 13 is opened to the 90 degree position, which relieves torsion from the counter balance spring 46. The balance set screw 41 is released and the balance adjuster 40 is turned slightly with a spanner wrench in balance spanner wrench holes 42. If the counter balance spring 46 is too tight, the balance adjuster 40 is moved clockwise. If the counter balance spring 46 is too loose, the balance adjuster 40 is moved counterclockwise. The balance set screw 41 is then tightened.

Once a particular style of cover is balanced, a line can be inscribed on the balance adjuster and end cap, and labeled with the cover style. Different style covers can then be quickly adjusted.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

What is claimed is:

1. A chafing dish, comprising:
   a pan;
   a cover;
   a hinge shaft coupled to the pan and the cover;
   a first cover arm coupled to a first end of the hinge shaft and to the cover;
   a second cover arm coupled to a second end of the hinge shaft and to the cover;
   a counter balance member encircling a part of the hinge shaft;
   a hinge assembly coupled to a first end and a second end of the counter balance member, the counter balance member having a torsion enabling a counter balancing of the cover at any angle from a closed state to an unstressed state; and
   an externally adjustable balance adjustment mechanism coupled proximately to the first end of the hinge shaft, comprising a bearing support for the hinge shaft, the bearing support comprising a balance adjuster and a stop adjuster protruding through end caps of the hinge assembly, whereby allowing adjustment of the chafing dish without disassembly.

2. The chafing dish of claim 1, wherein the counter balance member comprises a torsion spring encircling the part of the hinge shaft.

3. The chafing dish of claim 1, wherein the pan comprises a water pan.

4. The chafing dish of claim 3, further comprising a food pan nested inside the water pan.

5. The chafing dish of claim 1, further comprising a cover handle for raising and lowering the cover.

6. The chafing dish of claim 1, further comprising a hinge support frame coupled to the hinge assembly and the pan.

7. A chafing dish, comprising:
   a pan;
   a cover;
   a hinge shaft coupled to the pan and the cover;
   a first cover arm coupled to a first end of the hinge shaft and to the cover;
   a second cover arm coupled to a second end of the hinge shaft and to the cover;
   a counter balance member encircling a part of the hinge shaft; and
   a hinge assembly coupled to a first end and a second end of the counter balance member, the counter balance member having a torsion enabling a counter balancing of the cover at any angle from a closed state to an unstressed state, wherein a first end of the first cover arm is coupled to the hinge shaft through fasteners, wherein a second end of the first cover arm is welded to the cover.

8. The chafing dish of claim 7, wherein the fasteners comprise thumb screws.

9. A chafing dish, comprising:
a pan;
a cover;
a hinge shaft coupled to the pan and the cover;
a first cover arm coupled to a first end of the hinge shaft and to the cover;
a second cover arm coupled to a second end of the hinge shaft and to the cover;
a counter balance member encircling a part of the hinge shaft; and
a hinge assembly coupled to a first end and a second end of the counter balance member, the counter balance member having a torsion enabling a counter balancing of the cover at any angle from a closed state to an unstressed state,
wherein the first end of the counter balance member is coupled to a balance adjuster and the second end of the counter balance member is coupled to a shaft anchor.

10. A chafing dish, comprising:
a pan;
a cover;
a hinge shaft coupled to the pan and the cover;
a first cover arm coupled to a first end of the hinge shaft and to the cover;
a second cover arm coupled to a second end of the hinge shaft and to the cover;
a counter balance member encircling a part of the hinge shaft;
a hinge assembly coupled to a first end and a second end of the counter balance member, the counter balance member having a torsion enabling a counter balancing of the cover at any angle from a closed state to an unstressed state; and
a condensate drain tube coupled to the cover and a condensate catch trough coupled to the pan, wherein condensate from the cover is able to drain from the condensate drain tube to the pan through the condensate catch trough.

11. A chafing dish, comprising:
a pan;
a cover;
a hinge shaft coupled to the pan and the cover;
a first cover arm coupled to a first end of the hinge shaft and to the cover;
a second cover arm coupled to a second end of the hinge shaft and to the cover;
a counter balance member encircling a part of the hinge shaft;
a hinge assembly coupled to a first end and a second end of the counter balance member, the counter balance member having a torsion enabling a counter balancing of the cover at any angle from a closed state to an unstressed state; and
a balance adjuster and a stop adjuster for supporting the hinge shaft.

12. The chafing dish of claim 11, further comprising:
a balance set screw for holding a position of the stop adjuster; and
a stop set screw for holding a position of the balance adjuster.

13. A chafing dish, comprising:
a pan;
a cover;
a hinge shaft coupled to the pan and the cover;
a first cover arm coupled to a first end of the hinge shaft and to the cover;
a second cover arm coupled to a second end of the hinge shaft and to the cover;
a counter balance member encircling a part of the hinge shaft;
a hinge assembly coupled to a first end and a second end of the counter balance member, the counter balance member having a torsion enabling a counter balancing of the cover at any angle from a closed state to an unstressed state; and
a shaft stop and a stop adjuster pin for limiting an opening of the cover to the unstressed state of the counter balance member.

* * * * *